United States Patent
Song et al.

(10) Patent No.: US 9,160,425 B2
(45) Date of Patent: Oct. 13, 2015

(54) BEAMFORMING WITH PHASE COMPENSATION

(75) Inventors: Xinghua Song, Beijing (CN); Lei Xiao, Beijing (CN); Huaisong Zhu, Beijing (CN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 46 days.

(21) Appl. No.: 14/130,474

(22) PCT Filed: Jul. 1, 2011

(86) PCT No.: PCT/CN2011/001088
§ 371 (c)(1),
(2), (4) Date: Jun. 10, 2014

(87) PCT Pub. No.: WO2013/003974
PCT Pub. Date: Jan. 10, 2013

(65) Prior Publication Data
US 2014/0286202 A1    Sep. 25, 2014

(51) Int. Cl.
H04B 7/01      (2006.01)
H04B 7/06      (2006.01)
H04B 7/26      (2006.01)
H04L 5/14      (2006.01)
H04B 7/08      (2006.01)
H04B 17/00     (2015.01)

(52) U.S. Cl.
CPC ............ *H04B 7/01* (2013.01); *H04B 7/0604* (2013.01); *H04B 7/0617* (2013.01); *H04B 7/0626* (2013.01); *H04B 7/0639* (2013.01); *H04B 7/0689* (2013.01); *H04B 7/086* (2013.01); *H04B 7/2643* (2013.01); *H04B 17/0005* (2013.01); *H04L 5/14* (2013.01)

(58) Field of Classification Search
None
See application file for complete search history.

(56) References Cited

U.S. PATENT DOCUMENTS

| 8,238,496 B1 * | 8/2012 | Narasimhan et al. ......... 375/346 |
| 2009/0093222 A1 | 4/2009 | Sarkar |
| 2010/0123625 A1 | 5/2010 | Martin et al. |

(Continued)

FOREIGN PATENT DOCUMENTS

| CN | 101729140 A | 6/2010 |
| TW | 442999 B | 6/2001 |

(Continued)

OTHER PUBLICATIONS

European Search Report dated Jan. 21, 2015, issued in European Patent Application No. 11869168.2, 3 pages.

(Continued)

*Primary Examiner* — Kerri Rose
(74) *Attorney, Agent, or Firm* — Rothwell, Figg, Ernst & Manbeck, P.C.

(57) ABSTRACT

A method and a base station for phase compensation in beamforming in a multi-antenna Time Division Duplex (TDD) communication network. In a first transmission mode, the base station estimates a first phase shift between a first antenna port and a reference antenna port in uplink based on a measurement of a first Sounding Reference Signal (SRS). Then the base station estimates in the first transmission mode a second phase shift between the first antenna port and the reference antenna port in downlink based on a Channel State Information (CSI) feedback from a User Equipment (UE), and calculates a parameter indicative of a difference between the first phase shift and the second phase shift.

13 Claims, 5 Drawing Sheets

(56) References Cited

U.S. PATENT DOCUMENTS

2012/0088514 A1* 4/2012 Lee et al. ............... 455/450
2012/0281555 A1* 11/2012 Gao et al. ............... 370/252

FOREIGN PATENT DOCUMENTS

WO     2008139630 A1    11/2008
WO     2010087749 A1    8/2010

OTHER PUBLICATIONS

3GPP, 3rd Generation Partnership Project; Technical Specification Group Radio Access Network; Evolved Universal Terrestrial Radio Access (E-UTRA); Physical Channels and Modulation (Release 8), 3GPP TS 36.211 V8.7.0, 2009, 83 pages.

3GPP, 3rd Generation Partnership Project; Technical Specification Group Radio Access Network; Evolved Universal Terrestrial Radio Access (E-UTRA); Physical layer procedures (Release 8), 3GPP TS 36.213 V8.7.0, 2009, 77 pages.

* cited by examiner

BEAMFORMING WITH PHASE COMPENSATION

CROSS REFERENCE TO RELATED APPLICATION(S)

This application is a 35 U.S.C. §371 National Phase Entry Application from PCT/CN2011/001088, filed Jul. 1, 2011, designating the United States, the disclosure of which is incorporated herein in its entirety by reference.

TECHNICAL FIELD

The present invention generally relates to phase compensation in beamforming, particularly to a method for phase compensation in beamforming in a multi-antenna Time Division Duplex (TDD) communication network and a base station for implementing the same.

BACKGROUND

Multi antenna technology has attracted attention in wireless communications, because it offers significant increases in data throughput and link range without additional bandwidth or transmit power. In 3GPP (3rd Generation Partner Project) Long Term Evolution (LTE), different multi antenna schemes have been defined for downlink transmission, e.g. in 3GPP TS 36.211: "Evolved Universal Terrestrial Radio Access (E-UTRA); Physical channels and modulation", V8.7.0. The defined schemes include Transmission Mode 3 (TM3, open loop spatial multiplexing), TM4 (close loop spatial multiplexing), TM7 (single-layer beamforming) and TM8 (dual-layer beamforming), etc. In general, they can be categorized into two kinds: codebook based pre-coding (TM3, TM4) and non-codebook based beamforming (TM7, TM8). Among the transmission modes, TM7 and TM8 are preferred for Time Division-Long Term Evolution (TD-LTE) due to the nature of TDD channel reciprocity, i.e. the property that the signals in uplink and downlink travel through the same frequency band will undergo the same physical perturbations (i.e. reflection, refraction, diffraction, etc. . . . ).

An important requirement for beamforming is to eliminate or compensate different phase shifts as introduced by different antenna ports. FIG. 1 shows a channel model of one antenna port in a TDD system. As shown in FIG. 1, the downlink channel consists of two parts: the transmitter (DL) RF front end path (referred to as RF path hereinbelow) and the wireless channel over air (denoted as Uu in FIG. 1). In the same way, the uplink channel consists of the receiver (UL) RF path and the wireless channel over air. Here the RF path includes RF cable between evolved Node B (eNB) and the antenna, analog devices (like power amplifier (PA), Analog to Digital converter/Digital to Analog converter (ADC/DAC), etc.) and the antenna. In practical systems, all these components on the RF path will introduce different phase shifts between different antenna ports. To perform beamforming e.g. in downlink, it is therefore required to compensate not only the phase shifts between antennas as introduced by the downlink Uu part but also that introduced by the downlink RF path.

The use of channel reciprocity is usually suggested for TDD systems. The eNB could obtain downlink channel state information (CSI) and in turn the phase shift for each antenna port based on the uplink channel estimation. Typically, uplink channel estimation is a Sounding Reference Signal (SRS)-based channel probing as defined in 3GPP TS 36.213: "Evolved Universal Terrestrial Radio Access (E-UTRA); Physical layer procedures", V8.7.0. The sounding procedure for each antenna port N is illustrated in FIG. 2. First, the eNB configures the sounding bandwidth, periodicity and hopping patterns through Radio Resource Control (RRC) signaling for each User Equipment (UE). Then the UE period transmits the SRSs based on the signaled configuration, and the eNB estimates the uplink equivalent channel including both Uu and UL RF path based on the received SRSs and obtains the CSI of the uplink equivalent channel.

However, it should be noted that the channel reciprocity is only valid for wireless channel over air (the Uu part). In practical systems, there are noticeable differences between the UL and DL RF paths due to, e.g., different electronic components used in UL/DL RF path, temperature, humidity, etc. The CSI for the uplink equivalent channel including both Uu and UL RF path as obtained by the SRS-based channel probing can not be used as the downlink CSI based on which the phase shift for each antenna port is calculated. In traditional TDD systems, this problem is solved by antenna calibration, which utilize a coupling network (integrated with antenna) to detect CSI of RF path for downlink and uplink separately. With calibration, the eNB may obtain the phase shifts as introduced by the UL/DL RF paths, and in turn calculate the phase shift as introduced by the whole DL channel based on the channel reciprocity.

Unfortunately, coupling network for antenna calibration is not always available. Many TDD operators have invested a lot for 4/8 ports antenna in 2G and 3G. For example, Time Division-Synchronous Code Division Multiple Access (TD-SCDMA) system has been deployed in China, where 8 antennas are used at each base station. Personal Handyphone System (PHS) has been deployed in Japan, where base stations are equipped with 4/8 ports antennas. From migration perspective, the operators require vendors to provide solution for deployment of TD-LTE in the existing 2G (like PHS) system or 3G system (like TD-SCDMA). However, coupling networks are not always available in these existing 2G/3G TDD systems. For example, for the PHS system in Japan, there is no coupling network integrated in antennas, and for the TD-SCDMA system in China, coupling network is only equipped for outdoor coverage antennas, but not for indoor coverage antennas.

SUMMARY

Therefore, it is an object to solve at least one of the above-mentioned problems.

According to one aspect of the invention, a method in a base station for phase compensation in beamforming in a multi-antenna communication network is provided. The method comprises estimating in a first transmission mode, a first phase shift between a first antenna port and the reference antenna port in uplink based on a measurement of a first SRS, estimating in the first transmission mode, a second phase shift between the first antenna port and the reference antenna port in downlink based on a CSI feedback from a UE, and calculating a parameter indicative of a difference between the first phase shift and the second phase shift. The method further comprises estimating in a second transmission mode, a third phase shift between a first antenna port and a reference antenna port in uplink based on a measurement of a second SRS, calculating in the second transmission mode, a fourth phase shift between the first antenna port and the reference antenna port in downlink as a difference between the third phase shift and the parameter, and compensating in the second transmission mode, the phase of input signal on the first antenna port by the fourth phase shift for beamforming.

In this way, the phase shift between antenna ports in the TDD network can be compensated without a traditional coupling network. When the phase shift in downlink has been compensated for all the antenna ports, the base station can perform beamforming so that signals from the antenna ports can be coherently combined at the UE side.

According to another aspect of the invention, a base station for phase compensation in beamforming in a multi-antenna Time Division Duplex (TDD) communication network is provided. The base station comprises a plurality of antenna ports including at least a first antenna port and a reference antenna port, and a processing unit. The processing unit is adapted to estimate in a first transmission mode, a first phase shift between the first antenna port and the reference antenna port in uplink based on a measurement of a SRS, estimate in the first transmission mode, a second phase shift between the first antenna port and the reference antenna port in downlink based on a CSI feedback from a UE, and calculate a parameter indicative of a difference between the first phase shift and the second phase shift. The processing unit is further adapted to estimate in a second transmission mode, a third phase shift between the first antenna port and the reference antenna port in uplink based on a measurement of a second SRS, calculate in the second transmission mode, a fourth phase shift between the first antenna port and the reference antenna port in downlink as a difference between the third phase shift and the parameter, and compensate in the second transmission mode, the phase of input signal on the first antenna port by the fourth phase shift for beamforming.

According to still another aspect of the invention, a multi-antenna TDD communication network comprising the above base station is provided.

BRIEF DESCRIPTION OF THE DRAWINGS

The invention, together with further objects and advantages thereof, will be best understood by reference to the following description taken together with the accompanying drawings, in which.

DETAILED DESCRIPTION

Figure 1:
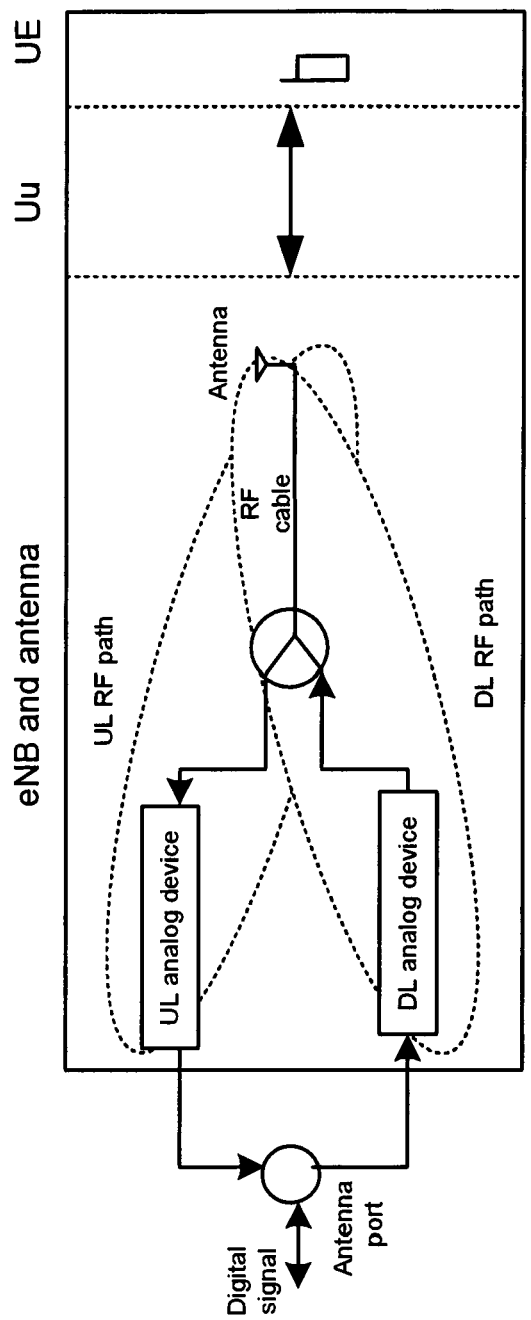
FIG. 1 is a schematic view of a channel model of one antenna port in a TDD system.
Figure 2:
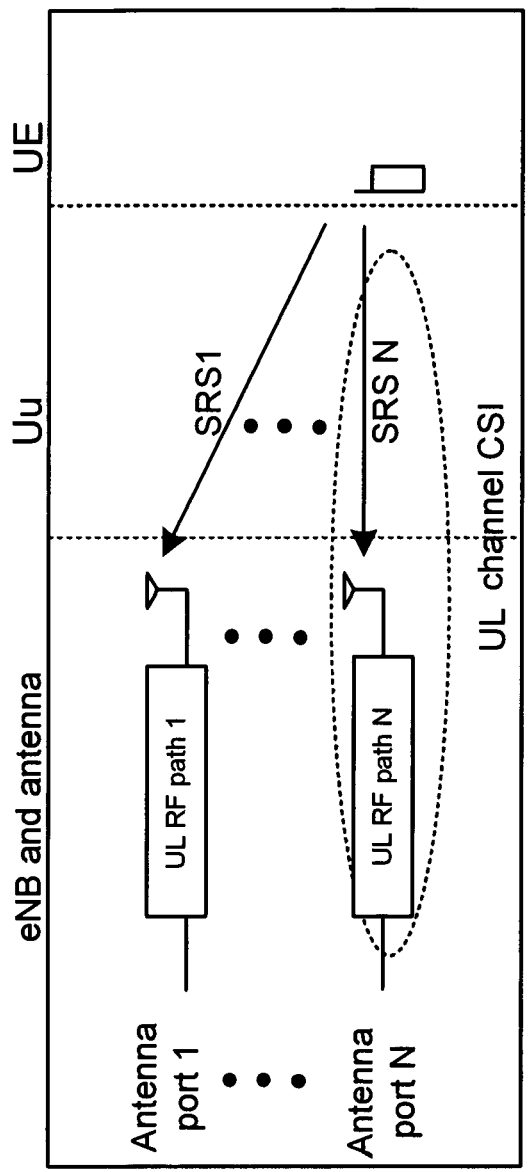
FIG. 2 is a schematic view of a SRS-based channel probing in a TDD system.

Embodiments of the present invention will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The present invention is described below with reference to block diagrams and/or flowchart illustrations of methods, apparatus, networks (systems) and/or computer program products according to embodiments of the invention. It is understood that blocks of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

Embodiments of the invention will be described below with reference to the drawings.

Embodiments of this invention provides a beamforming method for a multi-antenna Time Division Duplex (TDD) communication network which can compensate the phase shift between antenna ports without a traditional coupling network.

For simplicity, the beamforming method is explained with an example of two antenna ports. The same procedures can easily be extended to the situations of 4, 8 or more antenna ports.

In the description, suppose a base station such as an eNB uses two antenna ports 0 and 1 for downlink beamforming. As elaborated above, the downlink channel phase shift is introduced by two parts: the downlink RF path and the Uu part, so is the uplink channel phase shift. Since the beamforming only requires that relative phase shift between antenna ports are compensated, we will discuss the relative phase shift of the antenna port 1 using the antenna port 0 as a reference. The invention proposes to compensate the phase shift between antenna ports for beamforming in the TM7 or TM8 by using a parameter which was calculated earlier in the TM4 or TM8.

Figure 3:
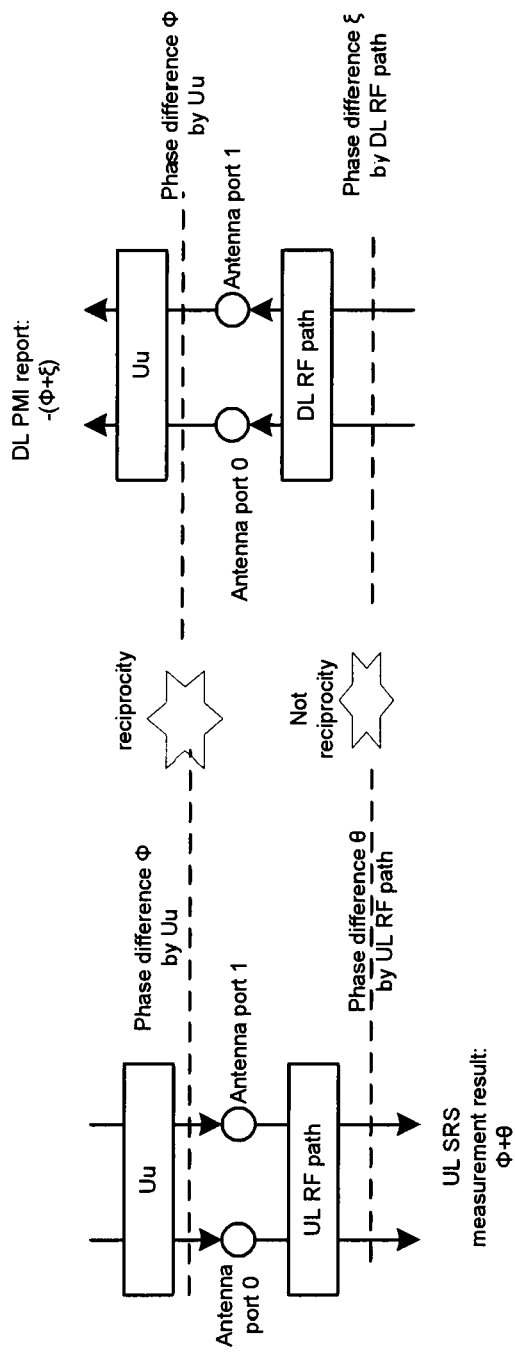
FIG. 3 is a schematic view of the first stage of calculating the parameter in TM4 or TM8 in accordance with an embodiment of the invention.

FIG. 3 is a schematic view of the first stage of calculating the parameter in TM4 or TM8 in accordance with an embodiment of the invention.

The following notations are defined to facilitate description:

($\Phi$): Phase shift of the antenna port 1 relative to the antenna port 0 as introduced by the Uu part, which is the same or almost the same for uplink and downlink;

$\theta$: Phase shift of the antenna port 1 relative to the antenna port 0 as introduced by the uplink RF path part;

$\xi$: Phase shift of the antenna port 1 relative to the antenna port 0 as introduced by the downlink RF path part.

As shown in FIG. 3, the phase shift introduced by the Uu part $\Phi$ is the same for uplink and downlink due to the TDD channel reciprocity. The phase shift introduced by the uplink RF part $\theta$ is different from the phase shift introduced by the downlink RF part $\xi$. The difference thereof ($\theta-\xi$) may be calculated by making use of both the SRS-based channel probing and a Precoding Matrix Indicator (PMI)-based channel probing.

The PMI-based channel probing is defined in 3GPP TS 36.213: "Evolved Universal Terrestrial Radio Access (E-UTRA); Physical layer procedures", V8.7.0. The UE will feedback implicit channel state information such as PMI, Rank Indicator (RI) or Channel Quality Indicator (CQI) to the eNB in most of the transmission modes, e.g. TM4, TM8. Specifically, the PMI feedback is selected from a fixed codebook set based on a UE-reported recommendation. In principle, the UE will select the pre-coding matrix that best matches the instantaneous channel state information. In case of single layer transmission, PMI corresponds to a precoding vector. Since the precoding vector has the same amplitude, it will to some extent reflect the phase relation of the channel between the available antenna ports. Following the PMI feedback, the eNB could apply pre-coding, which is the case in TM4, i.e. closed loop spatial multiplexing.

Then the relative difference $\Delta$ between the phase shift introduced by the uplink RF part $\theta$ and the phase shift introduced by the downlink RF part $\xi$ can be calculated by $$\Delta=\theta-\xi=(\Phi+\theta)-(\Phi+\xi) \quad (1)$$

As shown in FIG. 3, ($\Phi+\theta$) is the phase shift of the uplink channel including both the Uu and UL RF path, which can be obtained by SRS measurement. ($\Phi+\xi$) is the phase shift of the downlink channel including both the Uu and DL RF path, which can be obtained by PMI report in e.g. TM4 or TM8. That is, when operating in TM4 or TM8, the eNB can calculate the parameter $\Delta$ by subtracting the PMI reported phase difference from the SRS measured phase difference. The parameter $\Delta$ can be used for later beamforming.

Figure 4:
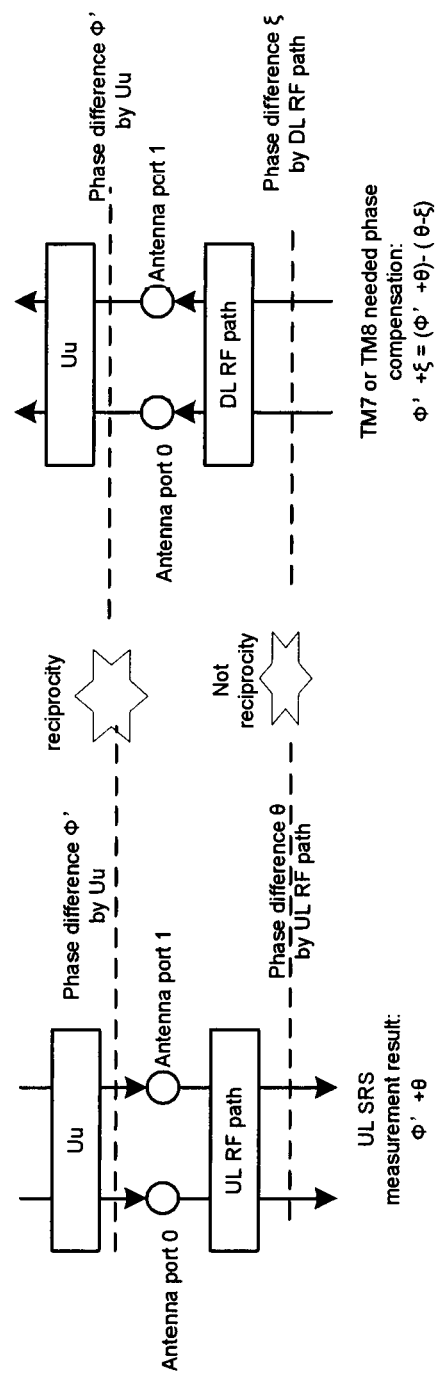
FIG. 4 is a schematic view of compensating phase shift for beamforming in TM7 or TM8 in accordance with an embodiment of the invention.

FIG. 4 is a schematic view of compensating phase shift for beamforming in TM7 or TM8 in accordance with an embodiment of the invention.

In order to compensate the phase shift for beamforming in TM7 or TM8, the eNB needs to calculate the phase shift of the downlink channel at that time. As shown in FIG. 4, phase shift of the downlink channel includes the phase shift as introduced by the Uu part and the phase shift as introduced by the DL RF path in TM7 or TM8. The channel condition varies with time, so does the phase shift as introduced by the Uu part. Thus as shown in FIG. 4, the phase shift as introduced by the Uu part in TM7 or TM8 is indicated as $\Phi'$ to distinguish over the phase shift $\Phi$ in TM4 or TM8. The phase shift as introduced by the DL RF path $\xi$ and the phase shift as introduced by the UL RF path $\theta$ are relatively stable and can be deemed not varying with time.

The phase shift of the downlink channel in TM7 or TM8 can be calculated by $$\Phi'+\xi=(\Phi'+\theta)-(\theta-\xi) \quad (2)$$

In the above equation (2), ($\Phi'+\theta$) is the phase shift of the uplink channel including both the Uu and UL RF path in TM7 or TM8, which can be obtained by another SRS measurement. ($\theta-\xi$) is the parameter $\Delta$ which is known to the eNB. That is to say, when operating in TM7 or TM8, the eNB can calculate the phase shift of the downlink channel between the antenna port 1 and antenna 0 by subtracting the parameter $\Delta$ from the SRS measured phase shift. Then the eNB accordingly compensates the phase shift of the downlink channel between the antenna port 1 and antenna 0 for beamforming, so that the signals from different antenna ports can be coherently combined at UE side.

The parameter $\Delta$, i.e. the difference between the phase shift introduced by the uplink RF part and the phase shift introduced by the downlink RF part can be defined as a cell-specific parameter. Once calculated for one UE, the parameter can be reused for other UEs. With this parameter, the eNB only needs a SRS measurement to calculate the phase shift of the downlink channel. No calibration or coupling network is needed.

It should be understood that the measurement of SRS or PMI does not necessarily have to be performed once as illustrated in FIG. 3 and FIG. 4. In practice, the PMI feedback is periodically reported by the UE, for example, once every 10 ms. The eNB may use an average of received PMI reports over a predetermined time period for calculating the relative difference $\Delta$. The more frequently the PMIs are reported, the more accurate the parameter $\Delta$ and the phase shift of the downlink channel can be. Preferably, the frequency of the PMIs being reported is selected such that the beamforming performance loss is tolerable as compared with the case of coupling network based calibration. Similarly, the measurement of the SRS in TM4 or TM8 can be taken as an average of received SRSs over a first predetermined time period, and measurement of the second SRS in TM7 or TM8 can be taken as an average of received SRSs over a second predetermined time period. The first predetermined period may be greater than the second predetermined period. Averaging in time domain can greatly reduce variation of Uu and UE implementation. In addition, averaging all SRS measurements corresponding to the same PMIs can reduce the quantization error which can be modeled as white noise.

In an embodiment, frequency selective PMI may be used. With the frequency selective PMI feedback, the phase difference on different sub-band can be calculated, which enables frequency selective beamforming.

Figure 5:
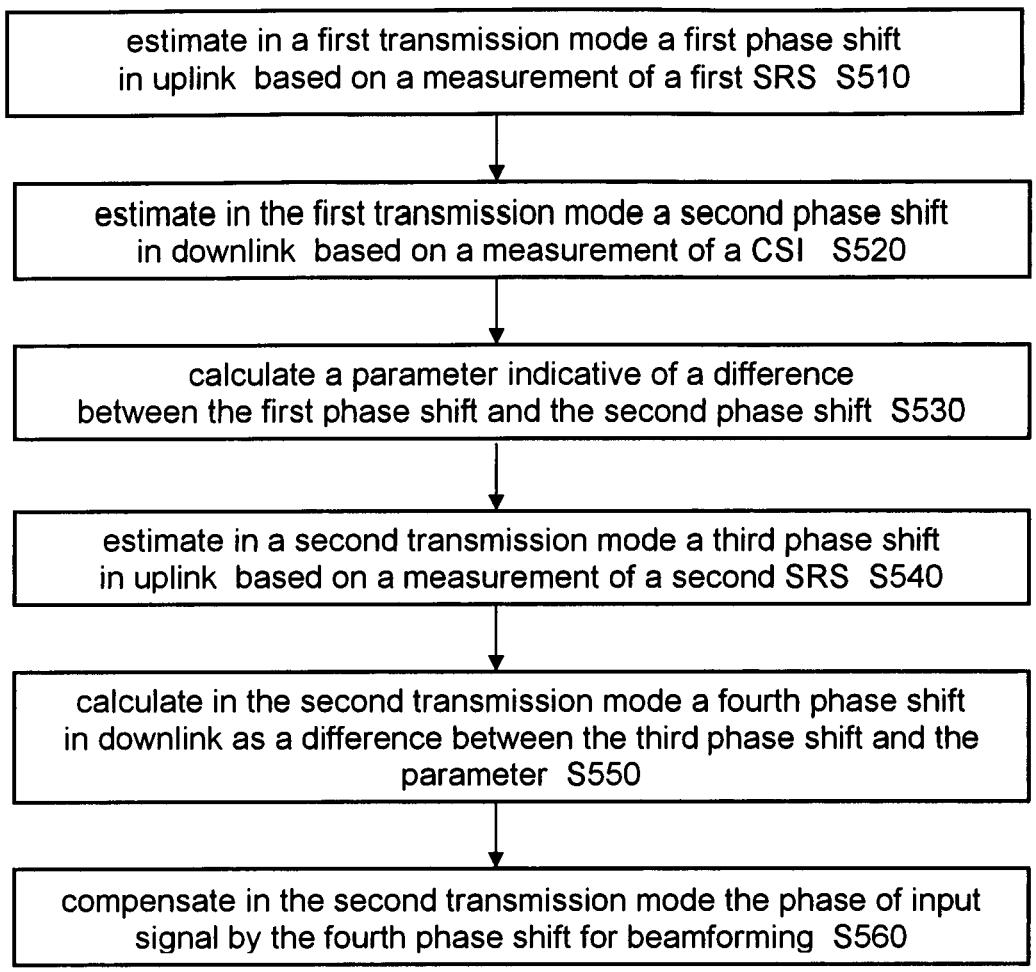
FIG. 5 is a flowchart illustrating a method for phase compensation in beamforming in a multi-antenna TDD communication network in accordance with an embodiment of the invention.

FIG. 5 is a flowchart illustrating a method for phase compensation in beamforming in a multi-antenna TDD communication network in accordance with an embodiment of the invention.

The case of two antenna ports are extended to that of M antenna ports which are indicated as $N_0, \ldots N_{M-1}$. To facilitate description, suppose the antenna port $N_0$ is the reference port. However, it is clear to those skilled in the art that any of the antenna ports can be selected as the reference port.

In a first transmission mode, e.g. TM4 or TM8, the eNB estimate in S510, a first phase shift between a first antenna port $N_i$ (i=1, ..., M−1) and the reference antenna port $N_0$ in uplink ($\Phi+\theta$) based on a measurement of a first SRS. Then the eNB estimates in S520 in the first transmission mode, a second phase shift between the first antenna port $N_i$ and the reference antenna port $N_0$ in downlink ($\Phi+\xi$) based on a CSI feedback from a UE, and calculates in S530 a parameter ($\Delta$) indicative of a difference between the first phase shift ($\Phi+\theta$) and the second phase shift ($\Phi+\xi$). In a second transmission mode, e.g. TM7 or TM8, the eNB estimates in S540 a third phase shift between the first antenna port $N_i$ and the reference antenna port $N_0$ in uplink ($\Phi'+\theta$) based on a measurement of a second SRS, and calculates in S550 in the second transmission mode, a fourth phase shift between the first antenna port $N_i$ and the reference antenna port $N_0$ in downlink ($\Phi'+\xi$) as a difference between the third phase shift ($\Phi'+\theta$) and the parameter ($\Delta$). The eNB then compensate in S560 in the second transmission mode, the phase of input signal on the first antenna port $N_i$ by the fourth phase shift ($\Phi'+\xi$) for beamforming.

The CSI may include PMI. M may be an integer selected from a group consisting of 2, 4 and 8. When the phase shift in downlink has been compensated for all the antenna ports, the eNB can perform beamforming in TM7 or TM8 so that signals from the antenna ports can be coherently combined at the UE side.

Figure 6:
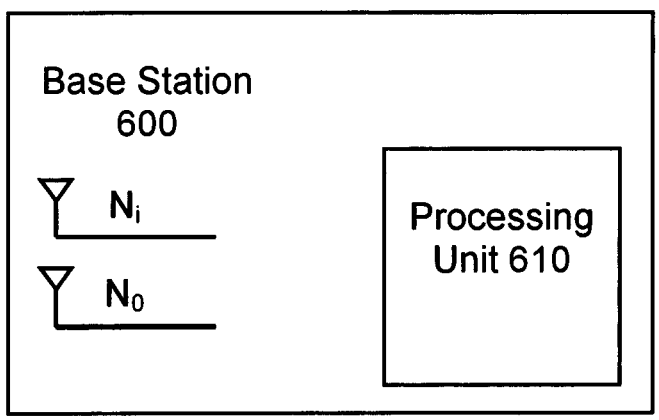
FIG. 6 is a schematic block diagram of the base station in accordance with an embodiment of the invention.

FIG. 6 is a schematic block diagram of the base station in accordance with an embodiment of the invention.

The base station 600 such as an eNB comprises a plurality of antenna ports (not shown) including at least a first antenna port $N_i$ (i=1, . . . , M−1) and a reference antenna port $N_0$. The base station 600 further comprises a processing unit 610. The processing unit 610 is adapted to estimate in a first transmission mode, a first phase shift between the first antenna port Ni and the reference antenna port $N_0$ in uplink ($\Phi'+\theta$) based on a measurement of a first SRS, estimate in the first transmission mode, a second phase shift between the first antenna port $N_i$ and the reference antenna port $N_0$ in downlink ($\Phi+\xi$) based on a channel state information (CSI) feedback from a UE and calculate a parameter ($\Delta$) indicative of a difference between the first phase shift ($\Phi+\theta$) and the second phase shift ($\Phi+\xi$). The processing unit 610 is further adapted to estimate in a second transmission mode, a third phase shift between the first antenna port $N_i$ and the reference antenna port $N_0$ in uplink ($\Phi'+\theta$) based on a measurement of a second SRS, calculate in the second transmission mode, a fourth phase shift between the first antenna port $N_i$ and the reference antenna port $N_0$ in downlink ($\Phi'+\xi$) as a difference between the third phase shift ($\Phi'+\theta$) and the parameter ($\Delta$), and compensate in the second transmission mode, the phase of input signal on the first antenna port $N_i$ by the fourth phase shift ($\Phi'+\xi$) for beamforming.

The accuracy of the phase compensation using the method of the invention is mainly limited by PMI quantization. A simulation for free space transmission in TM7 shows that the beamforming performance loss caused by the inaccuracy is less than about 1 dB as compared with the case of using coupling network. Such a loss is tolerable for real network.

In the above description, the specific terms such as eNB, UE are used herein, but it should be understood that other terms may be used in different standards or protocols to refer to the same or like entities. In addition, the invention may be applied to various multi-antenna TDD systems, including but not limited to TD-LTE.

While the preferred embodiments of the present invention have been illustrated and described, it will be understood by those skilled in the art that various changes and modifications may be made, and equivalents may be substituted for elements thereof without departing from the scope of the present invention. In addition, many modifications may be made to adapt to a particular situation and the teaching of the present invention without departing from its scope. Therefore it is intended that the present invention not be limited to the particular embodiment disclosed as the best mode contemplated for carrying out the present invention, but that the present invention include all embodiments falling within the scope of the appended claims.

The invention claimed is:

1. A method in a base station for phase compensation in beamforming in a multi-antenna Time Division Duplex (TDD) communication network, comprising the steps of:
   estimating, in a first transmission mode, a first phase shift between a first antenna port $N_i$ (i=1, . . . , M−1) and the reference antenna port $N_0$ in uplink ($\phi+\theta$) based on a measurement of a first Sounding Reference Signal (SRS);
   estimating, in the first transmission mode, a second phase shift between the first antenna port $N_i$ and the reference antenna port $N_0$ in downlink ($\phi+\xi$) based on a channel state information (CSI) feedback from a User Equipment (UE);
   calculating a parameter ($\Delta$) indicative of a difference between the first phase shift ($\phi+\theta$) and the second phase shift ($\phi+\xi$);
   estimating, in a second transmission mode, a third phase shift between the first antenna port $N_i$ and the reference antenna port $N_0$ in uplink ($\phi'+\theta$) based on a measurement of a second SRS;
   calculating, in the second transmission mode, a fourth phase shift between the first antenna port $N_i$ and the reference antenna port $N_0$ in downlink ($\phi'+\xi$) as a difference between the third phase shift ($\phi'+\theta$) and the parameter ($\Delta$); and
   compensating, in the second transmission mode, the phase of input signal on the first antenna port $N_i$ by the fourth phase shift ($\phi'+\xi$) for beamforming.

2. The method of claim 1, wherein the first transmission mode is a closed-loop spatial multiplexing transmission mode or dual-layer beamforming transmission mode, and the second transmission mode is a single-layer beamforming transmission mode or dual-layer beamforming transmission mode.

3. The method of claim 1, wherein the channel state information is Precoding Matrix Indicator (PMI).

4. The method of claim 1 wherein M is an integer selected from a group consisting of 2, 4 and 8.

5. The method of claim 1, wherein the measurement of the first SRS is an average of received SRSs over a first predetermined time period, and measurement of the second SRS is an average of received SRSs over a second predetermined time period.

6. The method of claim 5, wherein the first predetermined time period is greater than the second predetermined time period.

7. A base station for phase compensation in beamforming in a multi-antenna Time Division Duplex (TDD) communication network, comprising:
   a plurality of antenna ports including at least a first antenna port $N_i$ (i=1, . . . , M−1) and a reference antenna port $N_0$; and
   a processing unit adapted to:
   estimate, in a first transmission mode, a first phase shift between the first antenna port Ni and the reference antenna port $N_0$ in uplink ($\phi'+\theta$) based on a measurement of a first Sounding Reference Signal (SRS), estimate, in the first transmission mode, a second phase shift between the first antenna port $N_i$ and the reference antenna port $N_0$ in downlink ($\phi+\xi$) based on a channel state information (CSI) feedback from a User Equipment (UE);

calculate, a parameter ($\Delta$) indicative of a difference between the first phase shift ($\phi+\theta$) and the second phase shift ($\phi+\xi$);

estimate, in a second transmission mode, a third phase shift between the first antenna port $N_i$ and the reference antenna port $N_0$ in uplink ($\phi'+\theta$) based on a measurement of a second SRS;

calculate, in the second transmission mode, a fourth phase shift between the first antenna port $N_i$ and the reference antenna port $N_0$ in downlink ($\phi'+\xi$) as a difference between the third phase shift ($\phi'+\theta$) and the parameter ($\Delta$); and compensate, in the second transmission mode, the phase of input signal on the first antenna port $N_i$ by the fourth phase shift ($\phi'+\xi$) for beamforming.

8. The base station of claim 7, wherein the first transmission mode is a single-layer beamforming transmission mode or dual-layer beamforming transmission mode, and the second transmission mode is a closed-loop spatial multiplexing transmission mode or dual-layer beamforming transmission mode.

9. The base station of claim 7, wherein the channel state information is Precoding Matrix Indicator (PMI).

10. The base station of claim 7, wherein M is an integer selected from a group consisting of 2, 4 and 8.

11. The base station of claim 7, wherein the measurement of the first SRS is an average of received SRSs over a first predetermined time period, and measurement of the second SRS is an average of received SRSs over a second predetermined time period.

12. The base station of claim 11, wherein the first predetermined time period is greater than the second predetermined time period.

13. A multi-antenna Time Division Duplex (TDD) communication network, comprising a base station according to claim 7.

* * * * *